United States Patent [19]

Rathert

[11] Patent Number: 5,487,815
[45] Date of Patent: Jan. 30, 1996

[54] METHOD OF OPTIMIZING THE CONTROL OF THE MASS TRANSFER ZONE IN DISTILLATION COLUMNS

[75] Inventor: Hermann Rathert, Schwalbach am Taunus, Germany

[73] Assignee: Hoechst Aktiengesellschaft, Frankfurt, Germany

[21] Appl. No.: 191,389

[22] Filed: Feb. 2, 1994

Related U.S. Application Data

[63] Continuation of Ser. No. 806,739, Dec. 12, 1991, abandoned.

[30] Foreign Application Priority Data

Dec. 15, 1990 [DE] Germany .......................... 40 40 185.5

[51] Int. Cl.⁶ .................................................... B01D 3/42
[52] U.S. Cl. ............................ 203/2; 159/44; 202/160; 202/206; 203/DIG. 18
[58] Field of Search ........................... 203/1, 2, 3, 94, 203/98, DIG. 18; 202/160, 206; 374/141, 166, 143; 159/44

[56] References Cited

U.S. PATENT DOCUMENTS

| | | | |
|---|---|---|---|
| 2,299,899 | 10/1942 | Houghland | 203/2 |
| 2,580,651 | 1/1952 | Boyd, Jr. | 203/DIG. 18 |
| 2,684,326 | 7/1954 | Boyd | 203/2 |
| 2,758,793 | 8/1956 | Stoops et al. | 203/DIG. 18 |
| 2,994,643 | 8/1961 | Smalling | 203/2 |
| 3,268,420 | 8/1966 | Webber et al. | 203/2 |
| 3,361,646 | 1/1968 | MacMullan et al. | 203/2 |
| 3,464,895 | 9/1969 | Boyd | 203/2 |
| 3,773,627 | 11/1973 | Weber et al. | 203/2 |
| 3,830,698 | 8/1974 | Kleiss | 203/2 |
| 3,855,074 | 12/1974 | Mosler et al. | 203/2 |
| 4,024,027 | 5/1977 | Boyd | 203/2 |
| 4,028,194 | 7/1977 | Boyd | 203/2 |
| 4,401,512 | 8/1983 | Likins, Jr. | 203/2 |
| 4,488,936 | 12/1984 | Pieusser et al. | 203/1 |
| 4,894,145 | 1/1990 | Jensen | 203/2 |
| 5,132,918 | 7/1992 | Funk | 205/2 |
| 5,244,544 | 9/1993 | Lang et al. | 202/206 |

FOREIGN PATENT DOCUMENTS

| | | | |
|---|---|---|---|
| 0413866 | 2/1991 | European Pat. Off. | |
| 0538723 | 12/1976 | U.S.S.R. | 203/2 |
| 0570371 | 8/1977 | U.S.S.R. | 203/2 |
| 0597387 | 3/1978 | U.S.S.R. | 203/2 |
| 0596263 | 3/1978 | U.S.S.R. | 203/2 |
| 0725684 | 4/1980 | U.S.S.R. | 203/2 |
| 2144648 | 3/1985 | United Kingdom | 203/2 |

OTHER PUBLICATIONS

"Distillation Control by Output Feedback Designed via Order Reduction" Stefan K. Lehmann, 20/vol. II, pp. 297–302.

"Model–Based Techniques for Controlling Processes in Chemnical Engineering", E. D. Gilles, JFAC, pp. 256–270.

"Robust Control of Distillation Columns", JFAC, pp. 281–286.

"Prazisionsregelung von Destillationskolonnen durch Regelung des Konzentrationsgradienten", von D. M. Boyd, (pp. 33–38) 1976.

IFAC, vol. 2, "10th World Congress on Automatic Control 1987".

*Primary Examiner*—Virginia Manoharan
*Attorney, Agent, or Firm*—Connolly & Hutz

[57] ABSTRACT

A method of optimizing the control of the mass transfer zone in distillation columns. Distillation columns are control optimized by controlling the steam feed, reflux, or pressure by determining the deviation from nominal values of characteristic curves of characteristic areas determined by measuring two different theoretical plates in the mass transfer zone of the column.

5 Claims, 1 Drawing Sheet

METHOD OF OPTIMIZING THE CONTROL OF THE MASS TRANSFER ZONE IN DISTILLATION COLUMNS

This is a continuation of my application Ser. No. 07/806, 739, filed Dec. 12, 1991, now abandoned.

DESCRIPTION

Method of optimizing the control of the mass transfer zone in distillation columns.

The invention relates to a method of optimizing the control of the mass transfer zone in distillation columns by means of their characteristic areas which are dependent on pressure and heating steam.

Distillation columns are designed for certain mass flows at defined concentrations. The conditions which must be adhered to in order to obtain the required purities of the top and bottom products are taken from the basic calculations of the manufacturer. Since it is frequently impossible in operating practice to adhere to the required conditions, because of continually changing mass flows, substance compositions and even the substances themselves, distillation columns cannot be operated in accordance with their design data by the conventional control technique which is based on fixed preset nominal values.

This is to be remedied by the invention.

The invention achieves the object by a method which comprises a) measuring the temperature of two different theoretical plates in the mass transfer zone of the column, b) comparing the measured values with one of the characteristic curves of the characteristic areas, which represent the nominal values of the temperature and the distance between the points where the thermometers are installed in the column (plate number), and c) utilizing the deviation from the nominal value of the distance between the points where the thermometers are installed for controlling the steam feed and the reflux or the pressure.

In addition to the temperature on two different plates, the pressure in the column may also be measured. The deviation from the nominal value of the distance between the points where the thermometers are installed can also be utilized for controlling the steam feed, the side take-off and the reflux or the pressure.

The advantages of the invention are essentially to be seen in the fact that the steam rate, the side take-off rate and the reflux ratio can be continually adjusted to the changing feed rates with fluctuating compositions of substances. High bottom and top purities coupled with optimized steam consumption can be/are obtained, i.e. the mass transfer zone can be held at the right place and the composition of substances in the feed can be detected. In this manner, the heating of the distillation column by steam feed, the column pressure, or the reflux rate in the column, are each increased or decreased in order to correct any deviation from nominal plate number value. The latter is important for the mass conversion in upstream reactors.

BRIEF DESCRIPTION OF THE DRAWING

The single figure of drawing is a graph of temperatures and transfer zone plates in a distillation column for various operating pressures of the column.

The invention which is suitable in principle for optimizing the control of the mass transfer zone in distillation columns will be explained in more detail below by reference to a specific example.

Figure 1:
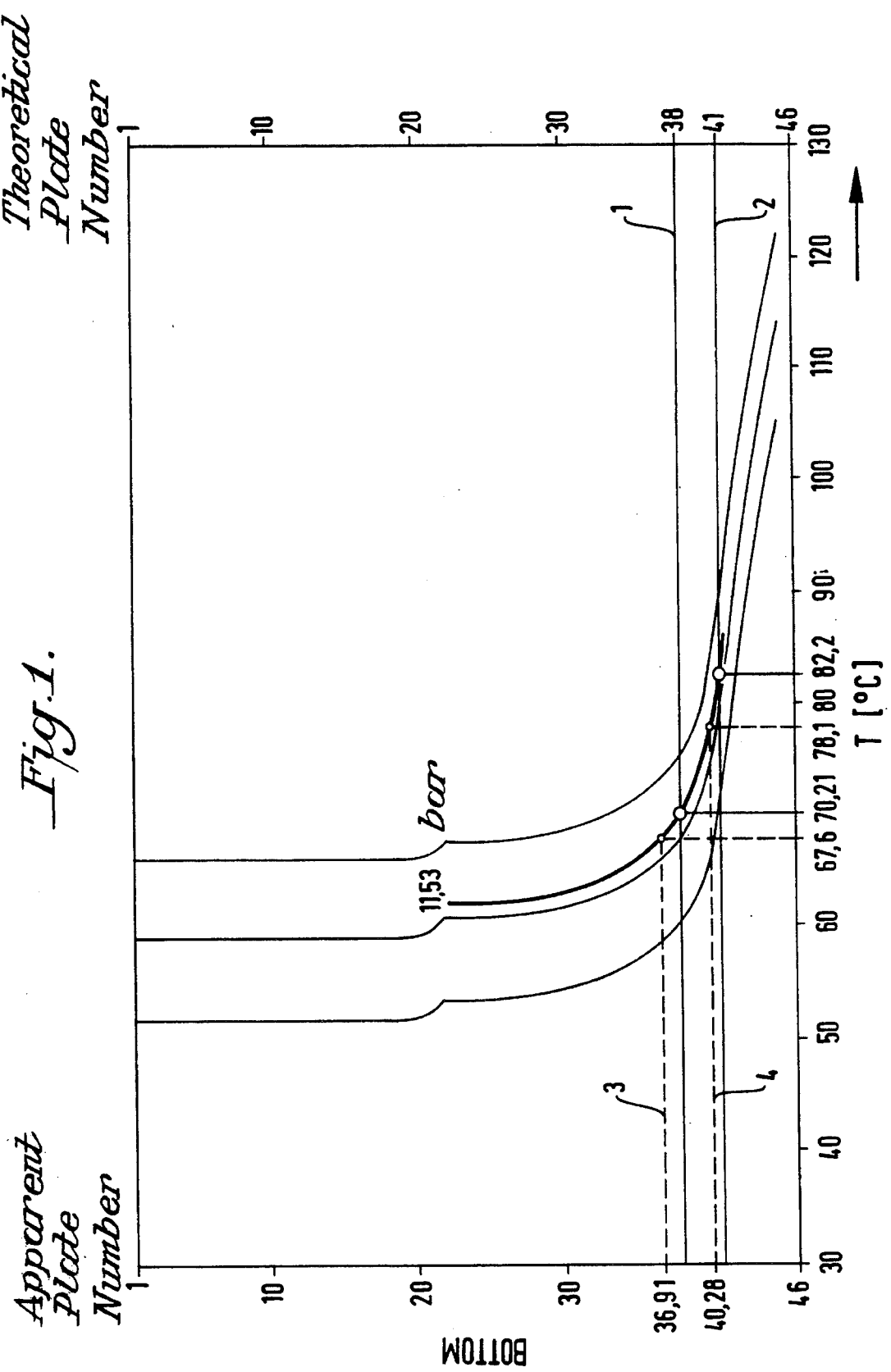

EXAMPLE 160 kg/h of a mixture of 35.1% of tetrafluorodichloroethane (F 114), 63.5% of pentafluoromonochloroethane (F 115) and 3400 ppm of tetrafluoromonochloroethane (F 124) and 40 kg/h of steam are fed to a distillation column which is operated at 11.53 bar and whose characteristic area and the characteristic curve for 11.53 bar can be taken from the diagram (FIG. 1). At the same time, 590 kg/h of top product composed of F 115 are recycled and 98 kg/h of top product are taken off. On the 41st (2) and 38th (1) theoretical plates of the transfer zone in the column, thermometers are installed which measure temperatures of 78.1° C. and 67.6° C. According to the characteristic curve for the operating pressure of the column, however, the temperatures on the 41st (2) and 38th (1) theoretical plates should be 82.8° C. and 70.21° C. The measured temperature is thus lower than the nominal temperature. According to a comparison with the characteristic curve, the thermometers appear to have shifted to the 40.28th (4) plate and 36.91st (3) plate (their apparent plate numbers). The steam controller compares the true distance between the thermometers with their apparent distance and adjusts the steam rate such that their true distance is restored. In this case, the steam rate is increased until a plate distance of three plates—i.e. the nominal distance—has been reached, which corresponds to actual temperatures of 78.2° C. and 68.1° C. respectively. Because of the inertia of the column, it can be advantageous, in parallel to the steam control, to select that characteristic curve from the characteristic area of the column which corresponds to the nominal distance between the thermometers—i.e. three plates. Since, however, the temperatures on these plates of the selected characteristic curve do not yet agree with the nominal temperatures, the reflux rate or the pressure in the column must be changed. The reflux controller compares the true point of installation of one of the thermometers with the apparent one and, in the case of a deviation, changes the reflux rate. In the present example, the reflux rate is reduced until the actual temperature agrees with the nominal temperature. The column has been adjusted to optimized operating conditions. Since the feed rate and/or the mixture composition continually change in practice, new steam rates and reflux rates are continuously set. Instead of controlling the reflux rate, the pressure in the column can also be controlled. The reflux control and pressure control can also be carried out simultaneously. By means of the method according to the invention, an optimized separation efficiency corresponding to the design data of the column is achieved at the working points indicated above. The analysis of the bottom product gives 93.94% of F 114, 2.7% of F 115 (desired product) and 0.85% of F 124, and that of the top product gives 0% F 114, 99.97% of F 115 (desired product) and 160 ppm of F 124.

Hence, as noted above, the present method maintains a mass transfer zone in distillation columns according to design data by controlling the zone by means of their characteristic area consisting of characteristic curves which are dependent on pressure and heating steam. The characteristic curve is selected from the characteristic area which corresponds to the nominal value of the distance between the plates, and the reflux or the pressure is adjusted until the nominal temperature at the point where the thermometers are installed is reached whereby the deviation relating to the location of the thermometers is compensated.

I claim:

1. A method of optimizing the performance of a heated distillation column, consisting essentially of the steps of:
   a) providing a heated distillation column having a mass transfer zone, a plurality of measurement positions which correspond to theoretical plate numbers, and design data for optimum separation efficiency, said design data including a plurality of pressure dependent characteristic curves which assign to each measurement position of the distillation column corresponding to a theoretical plate number a nominal temperature,
   b) feeding a distillable mixture to the distillation column and conducting said distillation process at an operating pressure to obtain a distilled product from a product take off means, and returning a portion of the distilled product at a reflux rate,
   c) measuring a first temperature at a first measurement position corresponding to a first theoretical plate number within said mass transfer zone,
   d) measuring a second temperature at a second measurement position corresponding to a second theoretical plate number within said mass transfer zone,
   e) selecting a pressure dependent characteristic curve for each of said first and second temperatures,
   f) comparing said first temperature to the selected pressure dependent characteristic curve, and determining a first apparent plate number from said first temperature,
   g) comparing said second temperature to the selected pressure dependent characteristic curve, and determining a second apparent plate number from said second temperature,
   h) determining the difference between said first and second apparent plate numbers,
   i) determining the difference between said first and second theoretical plate numbers, and
   j) controlling the column heating or the column pressure or the reflux rate using the difference between the apparent plate number difference and the theoretical plate number difference.

2. The method as claimed in claim 1, wherein the characteristic curve selected for determining the apparent plate number from each of said first and second temperatures is the same curve, and the characteristic curve selected for determining the apparent plate number from each of said first and second temperatures is the curve which corresponds to the operating pressure of the column.

3. The method as claimed in claim 1, wherein step j) is carried out by providing a rate of steam feed to said column, and increasing or decreasing said rate of steam feed.

4. The method as claimed in claim 1, wherein said step j) includes increasing or decreasing the rate of steam feed, the rate of take-off at a side take-off of the distillation column, the reflux rate, or the column pressure.

5. A method of optimizing the performance of a heated distillation column, consisting essentially of the steps of:
   a) providing a heated distillation column having a mass transfer zone, a plurality of measurement positions which correspond to theoretical plate numbers, and design data for optimum separation efficiency, said design data including a plurality of pressure dependent characteristic curves which assign to each measurement position of the distillation column corresponding to a theoretical plate number a nominal temperature,
   b) feeding a distillable mixture to the distillation column and conducting said distillation process at an operating pressure to obtain a distilled product from a product take off means, and returning a portion of the distilled product at a reflux rate,
   c) measuring a first temperature at a first measurement position corresponding to a first theoretical plate number within said mass transfer zone,
   d) measuring a first pressure at said first position,
   e) measuring a second temperature at a second measurement position corresponding to a second theoretical plate number within said mass transfer zone,
   f) measuring a second pressure at said second position,
   g) selecting the characteristic curve corresponding to the first pressure for determining the apparent plate number for the first temperature,
   h) comparing said first temperature to the selected pressure dependent characteristic curve, and determining a first apparent plate number from said first temperature,
   i) selecting the characteristic curve corresponding to the second pressure for determining the apparent plate number for the second temperature,
   j) comparing said second temperature to the selected pressure dependent characteristic curve, and determining a second apparent plate number from said second temperature,
   k) determining the difference between said first and second apparent plate numbers,
   l) determining the difference between said first and second theoretical plate numbers, and
   m) controlling the column heating or the column pressure or the reflux rate using the difference between the apparent plate number difference and the theoretical plate number difference.

* * * * *